US012680413B1

(12) United States Patent　　　　(10) Patent No.: US 12,680,413 B1
Zhang et al.　　　　　　　　　　　(45) Date of Patent: Jul. 14, 2026

(54) WELLBORE BARRIER, METHOD OF MANUFACTURE THEREOF AND ARTICLES COMPRISING THE SAME

(71) Applicant: Baker Hughes Oilfield Operations LLC, Houston, TX (US)

(72) Inventors: Zhihui Zhang, Katy, TX (US); Anil Sadana, Houston, TX (US); John Wakefield, Cypress, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 19/065,419

(22) Filed: Feb. 27, 2025

(51) Int. Cl.
　　*C09K 8/44*　　　　(2006.01)
　　*E21B 33/12*　　　(2006.01)
(52) U.S. Cl.
　　CPC ............ *E21B 33/1208* (2013.01); *C09K 8/44* (2013.01)
(58) Field of Classification Search
　　CPC .. E21B 33/12; E21B 33/1204; E21B 33/1208; E21B 33/124; E21B 33/138; E21B 33/1285; E21B 33/1292; E21B 33/1293; C09K 8/42; C09K 8/44
　　See application file for complete search history.

(56) References Cited

U.S. PATENT DOCUMENTS

| | | | | |
|---|---|---|---|---|
| 10,961,804 B1 * | 3/2021 | Fripp | ...................... | E21B 23/06 |
| 11,639,766 B2 * | 5/2023 | Fripp | ................... | F16L 55/163 |
| | | | | 138/98 |
| 11,761,290 B2 * | 9/2023 | Greci | ................. | E21B 33/1212 |
| | | | | 166/387 |
| 11,879,304 B2 * | 1/2024 | Abeidoh | ............. | E21B 33/1243 |
| 11,939,840 B2 * | 3/2024 | Newton | ................. | E21B 23/04 |
| 12,421,842 B2 * | 9/2025 | Katayama | ............. | E21B 44/005 |
| 2011/0073310 A1 * | 3/2011 | Clemens | ................ | E21B 23/06 |
| | | | | 166/135 |
| 2020/0370391 A1 | 11/2020 | Fripp et al. | | |

* cited by examiner

*Primary Examiner* — Angela M DiTrani Leff
(74) *Attorney, Agent, or Firm* — Baker Hughes Company

(57)　　　　　ABSTRACT

A synergistic barrier formation, including a matrix material with expandable metal particles dispersed homogeneously therein. A method of forming a synergistic barrier formation, including forming a wellbore barrier on a conduit disposed in a wellbore; the wellbore barrier including expandable metal particles, and exposing the wellbore barrier to water, acid, saline or heat. A method of forming a pack, including forming an expandable metal sleeve on the conduit, wherein the expandable metal sleeve comprises expandable metal particles, forming a swellable rubber sleeve on the conduit at a location distal to the expandable metal sleeve, exposing the expandable metal particles to water, acid, saline or heat causing the expandable metal sleeve to corrode to form corroded metal particles, detaching the corroded metal particles from the expandable metal sleeve, and consolidating the corroded metal particles on the swellable rubber sleeve.

6 Claims, 7 Drawing Sheets

100

150

125

550

126

151

122

WELLBORE BARRIER, METHOD OF MANUFACTURE THEREOF AND ARTICLES COMPRISING THE SAME

BACKGROUND

This disclosure relates to a wellbore barrier, methods of manufacture thereof and articles comprising the same. In particular, this disclosure relates to a wellbore barrier that contains controlled forming materials, methods of manufacture thereof and articles comprising the same.

In performing underground operations such as, for example, oil and natural gas exploration, carbon dioxide sequestration, exploration, and mining for minerals such as iron, uranium, and the like, exploration for water, and the like, it is often desirable to first drill a borehole that penetrates into the formation.

Once a borehole has been drilled, it is desirable for the borehole to be completed before minerals, hydrocarbons, and the like can be extracted from it. A completion involves the design, selection, and installation of equipment and materials in or around the borehole for conveying, pumping, controlling the production or injection of fluids into the borehole. After the borehole has been completed, the extraction of minerals, oil and gas, or water can begin.

Sealing systems, such as packers, are commonly deployed in a borehole as completion equipment. Packers are often used to isolate portions of a borehole from one another. For example, packers are used to seal the annulus between a tubing string and a wall (in the case of uncased or open hole) or casing (in the case of cased hole) of the borehole, isolating the portion of the borehole uphole of the packer from the portion of the borehole downhole of the packer.

SUMMARY

An embodiment of a synergistic barrier formation, including a conduit disposed in a wellbore, a wellbore barrier disposed on the conduit, the wellbore barrier including a matrix material with expandable metal particles dispersed homogeneously therein, and wherein the matrix material comprises a polymer, a bladder, or a combination thereof.

An embodiment of a method forming a synergistic barrier formation, the method including, forming a wellbore barrier on a conduit disposed in a wellbore, wherein the wellbore barrier including, a matrix material with expandable metal particles dispersed homogeneously therein, and wherein the matrix material comprises a polymer, a bladder, or a combination thereof, and exposing the wellbore barrier to water, acid, saline or heat.

An embodiment of a method forming a pack, including forming an expandable metal sleeve on the conduit, wherein the expandable metal sleeve including expandable metal particle, forming a swellable rubber sleeve on the conduit at a location distal to the expandable metal sleeve, exposing the expandable metal particles to water, acid, saline or heat causing the expandable metal sleeve to corrode to form corroded metal particles, detaching the corroded metal particles from the expandable metal sleeve, and consolidating the corroded metal particles on the swellable rubber sleeve.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the figures.

Disclosed herein is a synergistic wellbore barrier that comprises a controlled forming material homogeneously dispersed in a matrix material. A wellbore barrier is a device that seals the wellbore to isolate a portion of the wellbore. The controlled forming material is an element that can change shape under conditions including a chemical reaction, pressure, and/or temperature. The controlled forming materials are expandable metal particles that expand or swell in volume when reacted in the presence of water. The matrix material can be a polymer, elastic material, or a bladder.

As used herein, the term "synergistic" is used to describe the interactive relationship between the wellbore barrier and the wellbore surroundings. The wellbore barrier interacts with the surrounding environment such as the water or brine to so that the controlled forming materials can change shape. In short, the wellbore barrier is activated by the wellbore surroundings (e.g., the fluids in the wellbore facilitate the expansion of the controlled forming materials), which enable it to function it as a seal.

Disclosed herein too is a method for producing a seal within the wellbore using the controlled forming material. The controlled forming material comprises expandable metal particles that form a metallic sleeve disposed on a conduit. The expandable metal particles corrode within the environmental conditions of the wellbore environment. The corrosion process causes the expandable metal particles to react with water and expand or swell in volume. Once the expandable metal particles begin to corrode, the corroded expanded metallic particles or flakes detach and fall off. The particles or flakes consolidate on a swellable rubber plug and undergo consolidation in the presence of heat (i.e. an increased temperature) forming the wellbore barrier.

Figure 1A:
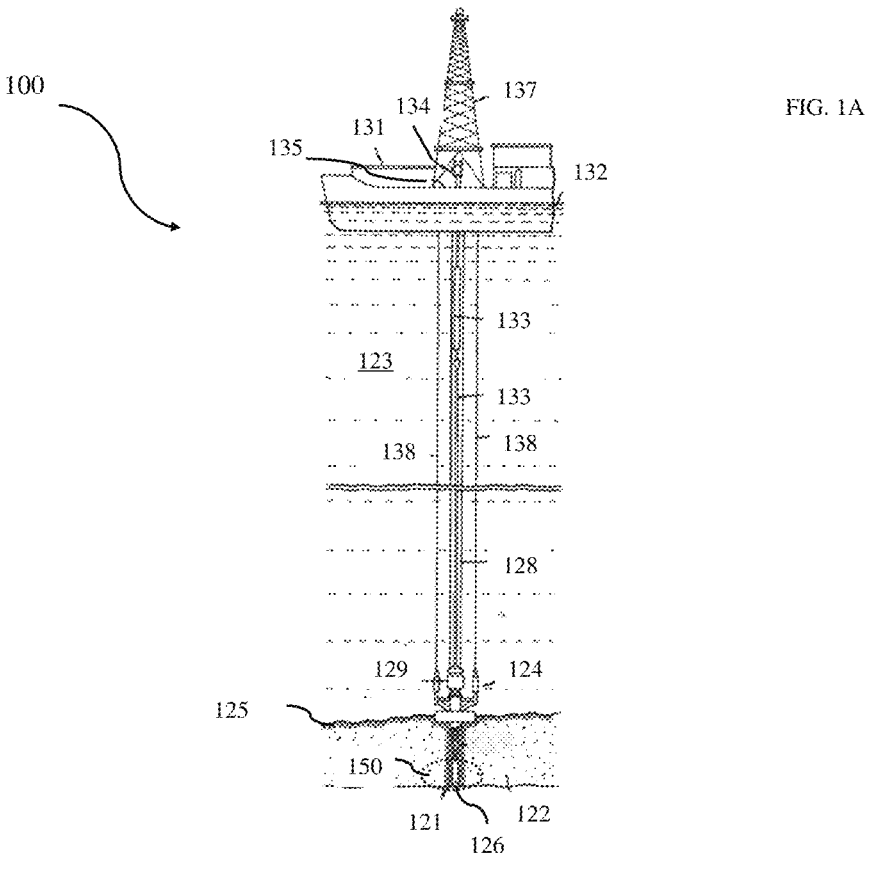
FIG. 1A illustrates an example of a completion assembly.

Referring initially to FIG. 1A, an upper completion assembly is installed in a well having a lower completion assembly disposed therein from an offshore oil or gas platform that is schematically illustrated and designated 100. There is shown a well 121 which has been drilled into the earth 122 beneath the sea 123 or other body of water. A subsea wellhead structure 124 is emplaced on the floor 125 of the sea at the top of the well. Suspended in the well from the well head is a string of well casing 126. A riser pipe 128 is in operable communication with the wellhead by a quick releasable connector 129 and communicates with the casing string through passages in the well head. The riser pipe extends up through the water to a drilling ship or vessel 131 floating on the surface 132 of the sea directly over the wellhead. The riser pipe extends up through an opening or moonhole (not shown) in the ship, and the top (not shown) of the riser pipe is exposed above the waterline and within the vessel. A string of drill pipe 133 extends within the riser pipe 128 upwardly from the quick releasable connector 129 and terminates at the top in an actuator launching head 134 accessible from the deck 135 of the drilling vessel. The drilling vessel is equipped with a derrick structure 137. Guidelines 138 extend between the vessel 131 and the subsea wellhead structure 124. The riser pipe 128 can have a blowout preventer stack (not shown) located above and closely adjacent to the quick releasable connector 129.

Figure 1B:
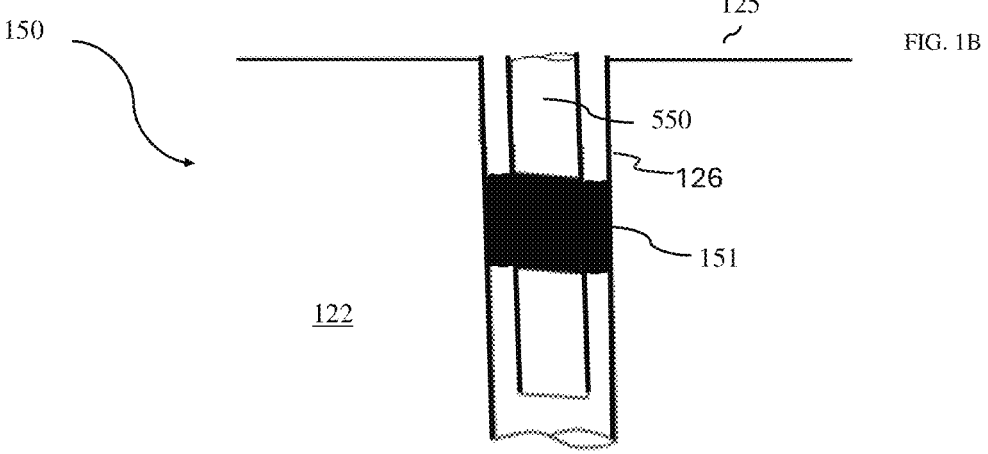
FIG. 1B illustrates an expanded view of the wellbore.

FIG. 1B shows an enlarged view of area 150 (FIG. 1A). The wellbore barrier 151 is located on the well casing 126 located below the floor 125 of the sea. The well casing 126 may contain one or more wellbore barriers along the length of the pipe to isolate different portions of the wellbore.

Even though FIGS. 1A and 1B depict a vertical wellbore, it can be understood by those skilled in the art that the apparatus according to the present disclosure is equally well suited for use in wellbores having other orientations including horizontal wellbores, slanted wellbores, uphill wellbores, multilateral wellbores, or the like. Accordingly, it can be understood by those skilled in the art that the use of directional terms such as "above," "below," "upper," "lower," "upward," "downward," "uphole," "downhole" and the like are used in relation to the illustrative embodiments as they are depicted in the figures, the upward direction being toward the top of the corresponding figure and the downward direction being toward the bottom of the corresponding figure, the uphole direction being toward the surface of the well, the downhole direction being toward the toe of the well. Further, even though FIGS. 1A and 1B depict an offshore operation, it can be understood by those skilled in the art that the apparatus according to the present disclosure is equally well suited for use in onshore operations. Further, even though FIGS. 1A and 1B depict a cased hole completion, it can be understood by those skilled in the art that the apparatus according to the present disclosure is equally well suited for use in open hole completions.

Examples of the methods and systems described herein relate to the use of sealing elements. As used herein, "sealing elements" refers to any element used to form a seal. As used herein. "expand," "expanding," or "expandable" it is meant that the element increases its volume.

Figure 2A:
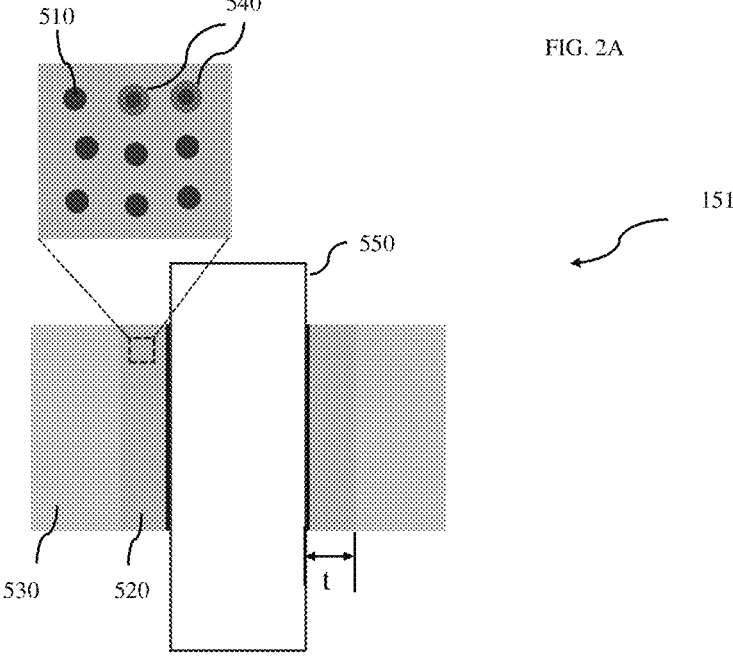
FIG. 2A illustrates an embodiment of the wellbore barrier.

FIG. 2A shows an embodiment of the wellbore barrier 151. The wellbore barrier is disposed on a conduit 550. The conduit can comprise the well casing 126 in a wellbore system. Expandable metal particles 510 are mixed with a matrix material 520 to form the wellbore barrier 151.

A pre-salt formation 530 surrounds the wellbore barrier 151. The pre-salt formation 530 refers to layers of sedimentary rocks that contain oil and natural gas reservoirs. The pre-salt formations can include one or more of the following materials—halite, anhydrite, carnallite, or other evaporates and has a hardness of 1 to 2 on the Mohs scale.

The matrix material 520 can be a polymer or an elastic material. The polymer is an organic polymer. The organic polymer may be selected from a wide variety of thermoplastic polymers, blend of thermoplastic polymers, thermosetting polymers, or blends of thermoplastic polymers with thermosetting polymers. The organic polymer may also be a blend of polymers, copolymers, terpolymers, or combinations comprising at least one of the foregoing organic polymers. The organic polymer can also be an oligomer, a homopolymer, a copolymer, a block copolymer, a random copolymer, a gradient copolymer, a graft copolymer, a star block copolymer, a dendrimer, a polyelectrolyte (polymers that have some repeat groups that contain electrolytes), a polyampholyte (a polyelectrolyte having both cationic and anionic repeat groups), an ionomer, or the like, or a combination thereof. The organic polymers have number average molecular weights greater than 10,000 grams per mole, preferably greater than 20,000 g/mole and more preferably greater than 50,000 g/mole.

Examples of thermoplastic polymers include a polyacrylic, a polycarbonate, a polyalkyd, a polystyrene, a polyolefin, a polyester, a polyamide, a polyaramid, a polyamideimide, a polyarylate, a polyurethane, an epoxy, a phenolic, a polysiloxane, a polyarylsulfone, a polyethersulfone, a polyphenylene sulfide, a polysulfone, a polyimide, a polyetherimide, a polytetrafluoroethylene, a polyetherketone, a polyether ether ketone, a polyether ketone ketone, a polybenzoxazole, a polyoxadiazole, a polybenzothiazole, a polybenzothiazinophenothiazine, a polypyrazinoquinoxaline, a polypyromellitimide, a polyguinoxaline, a polybenzimidazole, a polyoxindole, a polyoxoisoindoline, a polydioxoisoindoline, a polytriazine, a polypyridazine, a polypiperazine, a polypyridine, a polypiperidine, a polytriazole, a polypyrazole, a polycarborane, a polyoxabicyclononane, a polydibenzofuran, a polyphthalide, a polyacetal, a polyanhydride, a polyvinyl ether, a polyvinyl thioether, a polyvinyl alcohol, a polyvinyl ketone, a polyvinyl halide, a polyvinyl nitrile, a polyvinyl ester, a polysulfonate, a polysulfide, a polythioester, a polysulfone, a polysulfonamide, a polyurea, a polyphosphazene, a polysilazane, a polyolefin, or the like, or a combination thereof.

In an embodiment, the matrix material 520 is an elastomer. Suitable elastomers include a polybutadiene, a polyisoprene, a styrene-butadiene rubber, a poly(styrene)-block-poly(butadiene), a poly(acrylonitrile)-block-poly(styrene)-block-poly(butadiene), a polychloroprene, a epichlorohydrin rubber, a polyacrylic rubber, a silicone (such as polysiloxane), a fluorosilicone, a fluoroelastomer, a perfluoroelastomer, a polyether block amide, a chlorosulfonated polyethylene, an ethylene propylene diene rubber, an ethylene-vinyl acetate elastomers, or a combination thereof. Elastomers typically have an elastic modulus of less than 100 MPa when measured as per ATM D638.

In an embodiment, the matrix material 520 is one or more of the following: an ethylene-propylene-diene monomer rubber, a butadiene rubber, a styrene-butadiene rubber, a natural rubber, an acrylonitrile butadiene rubber, a styrene-butadiene-acrylonitrile resin, a butadiene-nitrile rubber, a polyisoprene rubber, an acrylate-butadiene rubber, a polychloroprene rubber, an acrylate-isoprene rubber, an ethylene-vinyl acetate rubber, a polypropylene oxide rubber, a polypropylene sulfide rubber, a fluoroelastomer, or a thermoplastic polyurethane rubber.

The matrix material 520 can be micro- or nano-sized particles that are fused together. The fusing of the particles of the matrix material facilitates the formation pathways that permit the wellbore fluid to diffuse through and contact the expandable metal particles 510. In an embodiment, the particle has an average particle size of about 0.05 to about 250 micrometers, about 0.05 to about 100 micrometers, about 0.05 to about 50 micrometers, about 0.05 to about 10 micrometers, about 0.5 to about 5 micrometers, or about 0.1 to about 3 micrometers.

Figure 2B:
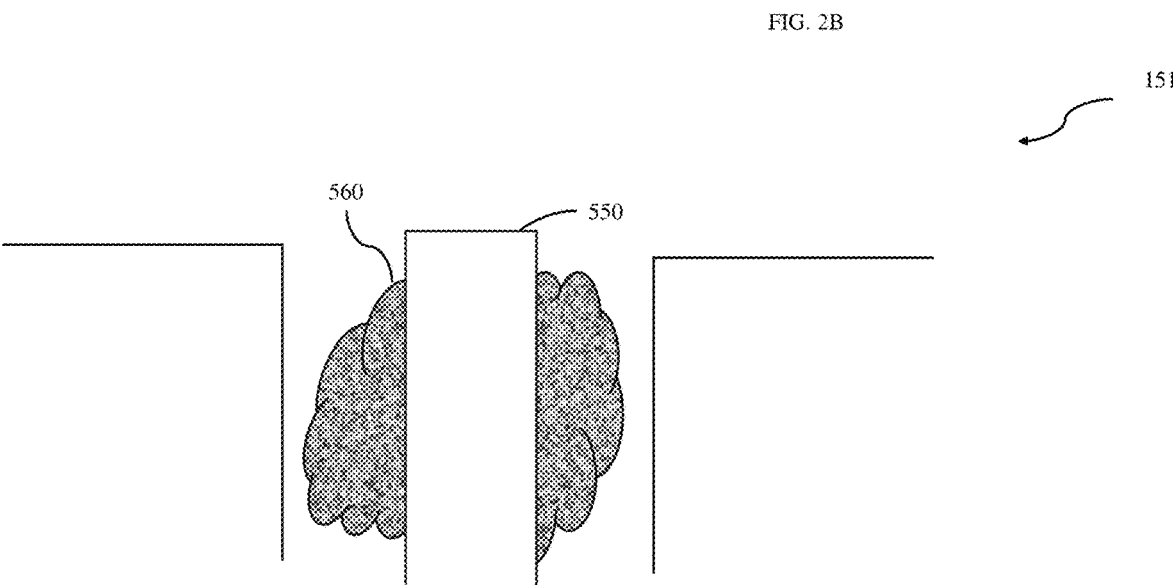
FIG. 2B illustrates an embodiment of the wellbore barrier.

The matrix material can be a bladder 560 (FIG. 2B) that includes pores, perforations, punctures, gaps, holes, voids, and the like to allow the wellbore fluid to be in fluid communication with the expandable metal particles 510 located within the bladder. The bladder can be a polymer, an elastomer, or a combination thereof. The bladder is a sleeve that encapsulates the expandable metal particles 510 or encapsulates the matrix material with the expandable metal particles contained therein. The polymers and elastomers are listed above and will not be listed here again in the interests of brevity.

The matrix material 520 is present in an amount of 15 to 95 weight % (wt %), based on a total weight of the wellbore barrier. In an exemplary embodiment, the matrix material 520 is present in an amount of 30 to 90 wt %, based on a total weight of the wellbore barrier.

The matrix material 520 is present in a volume amount of 25 to 97 volume % (vol %), based on a total weight of the wellbore barrier. In an exemplary embodiment, the matrix material 520 is present in an amount of 40 to 95 vol %, based on a total weight of the wellbore barrier.

The expandable metal particles 510 comprise a metal that chemically reacts with wellbore fluids to form a metal hydroxide. A volume of the resulting metal hydroxide can be substantially larger than a volume of the original expandable metal. Accordingly, the expandable metal expands in volume as the expandable metal hydrates form the metal hydroxide. The metal hydroxide is discharged into the wellbore to create a pressure seal within the wellbore.

The expandable metal particles 510 can include magnesium, aluminum, calcium, iron, silicon, zinc, tin, potassium, sodium, lithium, beryllium, barium, manganese, or a combination thereof.

In some embodiments, the expandable metals swell by undergoing metal hydration reactions in the presence of water or brines to form metal hydroxides. The metal hydroxide occupies more space than the base metal reactant. This expansion in volume allows the expandable metal to form a seal at the interface of the expandable metal and any adjacent surfaces. For example, a mole of magnesium has a molar mass of 24 g/mol and a density of 1.74 g/cm$^3$ which results in a volume of 13.8 cm$^3$/mol. Magnesium hydroxide has a molar mass of 60 g/mol and a density of 2.34 g/cm$^3$ which results in a volume of 25.6 cm$^3$/mol. 25.6 cm$^3$/mol is an 85% larger volume than 13.8 cm$^3$/mol. As another example, a mole of calcium has a molar mass of 40 g/mol and a density of 1.54 g/cm$^3$ which results in a volume of 26.0 cm$^3$/mol. Calcium hydroxide has a molar mass of 76 g/mol and a density of 2.21 g/cm$^3$ which results in a volume of 34.4 cm$^3$/mol. 34.4 cm$^3$/mol is a 32% larger volume than 26.0 cm$^3$/mol. In yet another example, a mole of aluminum has a molar mass of 27 g/mol and a density of 2.7 g/cm$^3$ which results in a volume of 10.0 cm$^3$/mol. Aluminum hydroxide has a molar mass of 63 g/mol and a density of 2.42 g/cm$^3$ which results in a volume of 26 cm$^3$/mol. 26 cm$^3$/mol is a 160% larger volume than 10 cm$^3$/mol.

The reaction rates of the expandable metals with water depend on the metal and temperature. Calcium reacts faster than magnesium with water at room temperature. Magnesium reacts rapidly in boiling water. In an embodiment, heated water can be injected into the wellbore to facilitate a conversion of the metal to the corresponding metal hydroxide. In another embodiment, heat can be applied once the injected water mixes with the expandable metal particles. Heat is typically applied to increase the temperature to a value greater than 30 degrees Celsius.

The expandable metal particles 510 can comprise any desired shape. The sizes or the dimensions of the metal particles are not particularly limited. Illustratively, metal particles comprise particles having an average particle size of about 1 micrometer to about 5 centimeters, about 10 micrometers to about 1 centimeter, 100 micrometers to 1000 micrometers, or about 1100 micrometers to about 5 centimeters. Particle size can be determined by an appropriate method of sizing particles such as by static or dynamic light scattering (SLS or DLS) using a laser light source, mechanical mesh sieving or the like.

In an embodiment, the expandable metal can be alloyed to alter the reaction rate. The metal alloy can be produced from a solid solution process or a powder metallurgical process. An alloy of magnesium, aluminum, calcium, iron, silicon, zinc, tin, potassium, sodium, lithium, beryllium, barium, or manganese can increase or decrease the reaction rate of the expandable metal. Metals that can be alloyed with the expandable metal include zinc, zirconium, yttrium, gold, tin, nickel, iron, copper, cobalt, iridium, palladium, mercury, gallium, or a combination thereof. Metal alloys include alloys of magnesium-zinc, magnesium-aluminum, calcium-magnesium, or aluminum-copper. In an embodiment, the metal alloys can comprise alloyed elements that are not metallic. Non-metallic elements include, but are not limited to, graphite, carbon, silicon, boron nitride, and the like.

The expandable metal particles 510 can comprise a coating that delays the hydration chemical reaction of the expandable metal. A coated particle in an initial state can include the coating that is completely intact. Because the coating is intact, water is not able to react with the expandable metal particle.

A coated particle may include a coating 540 that is disposed on the expandable metal particles 510 such that water has to diffuse through the coating to contact the metal. At the interface of the coating with the metal particle, a hydration chemical reaction can occur, which results in expansion of a portion of the expandable metal particle. The expansion of the portion of the expandable metal particle can cause a portion of the coating to fracture. Because the coating is no longer intact, the water is able to surround the expandable metal particle, which can result in further hydration chemical reactions.

In an embodiment, the coating can be a polymer, a ceramic, or a metal. The coating can be sprayed, dipped, electrodeposited, wetted, applied with an auto-catalytic reaction, vacuum evaporated from solvent, or applied with any other suitable technique.

The polymer coatings can comprise an epoxy resin, an acrylic resin, a polyamide, a polyurethane, a vinyl polymer or copolymer, a fluoropolymer, or a combination thereof.

The ceramic coatings can comprise aluminum oxide, titanium dioxide, zirconium oxide, chrome oxide, silicon carbide, silicon nitride, boron carbide titanium nitride, tungsten carbide, chromium carbide or a combination thereof.

The metal coating include zirconium, yttrium, gold, tin, nickel, copper, cobalt, iridium, palladium, mercury, gallium, or a combination thereof. The metal coating has a different composition from the composition of the expandable metal particles 510.

The expandable metal particles are present in an amount of 5 to 85 wt %, based on a total weight of the wellbore barrier. In an exemplary embodiment, the expandable metal particles are present in an amount of 10 to 70 wt %, based on a total weight of the wellbore barrier.

The expandable metal particles are present in a volume amount of 3 to 75 vol %, based on a total weight of the wellbore barrier. In an exemplary embodiment, the expandable metal particles are present in an amount of 5 to 60 vol %, based on a total weight of the wellbore barrier.

The wellbore barrier can have a thickness t (FIG. 2A) in an amount of 0.6 to 8 centimeters (cm). In an exemplary embodiment, the wellbore barrier can comprise a thickness in an amount of 1.25 to 4 cm.

The wellbore fluids can comprise water, fresh water, or brine. The brine can comprise saltwater (e.g., water containing one or more salts dissolved therein), saturated saltwater (e.g., saltwater produced from a subterranean formation), seawater, or a combination thereof. The brine can be from any source. The brine can be a monovalent brine or a divalent brine. Suitable monovalent brines can comprise sodium chloride brines, sodium bromide brines, potassium chloride brines, potassium bromide brines, and the like. Suitable divalent brines can comprise magnesium chloride brines, calcium chloride brines, calcium bromide brines, and the like. In an embodiment, the salinity of the brine can exceed 10 wt %.

A method of forming a synergistic barrier formation comprises forming a wellbore barrier 151 on a conduit 550 disposed in a wellbore 126. The wellbore barrier 151 comprises a matrix material 520 with expandable metal particles 510 dispersed homogeneously therein. The wellbore barrier is exposed to water, acid, saline or heat causing a reaction between the expandable metal particles and water resulting in a metal hydroxide. The metal hydroxide comprises a larger volume than the expandable metal particles before the reaction. The larger volume of the expandable metal particles causes the wellbore barrier to seal the wellbore.

In an embodiment, the expandable metal particles can result in a seal being self-healing. If the water-based wellbore fluid reaches the expandable metal particles within the matrix material, a subsequent hydration chemical reaction at the expandable metal particles can occur. The subsequent hydration chemical reaction produces the metal hydroxide or metal hydrate particles that can resolve a crack or leak that resulted in contact between the water-based wellbore fluid and the matrix material.

In an embodiment, the expandable metal particles can form a metallic sleeve that may be disposed on the well casing. The expandable metal particles are corroded, or permitted to corrode, to produce particles or flakes of the corroded metal or particles comprising a metal element, such as metal hydroxide particles or, equivalently, metal hydrate particles. The corrosion process is caused by the expandable metal particles reacting with water to form hydroxides. The corrosion occurs due to exposure to a wellbore fluid in the annulus. A corrosive environment can include water, acid, heat, and like. This galvanic corrosion process results in the hydroxide material being released from the base metal. In an embodiment, the metal is heat treated to change the grain size of the particles such as through annealing, solution treating, aging, quenching, and hardening.

Figure 3:
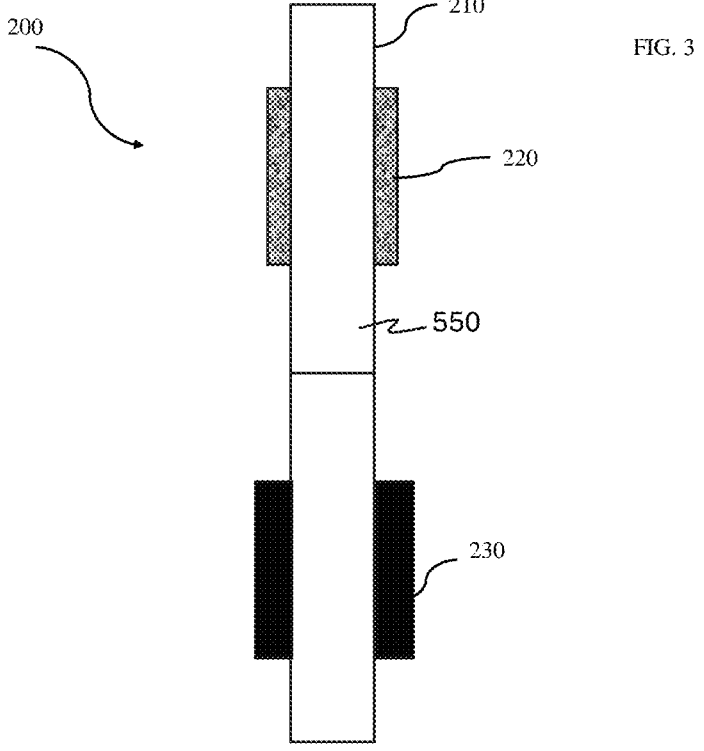
FIG. 3 illustrates an embodiment of the expandable metal sleeve.

FIG. 3 shows apparatus 200 which comprises an expandable metal sleeve 220 disposed on a conduit 210. The expandable metal sleeve 220 comprises the expandable metal particles. The conduit 210 can be the well casing 126 in a wellbore system. In an embodiment, one or more expandable metal sleeve 220 can be disposed on the well casing at various locations along the length of the well casing. A swellable rubber sleeve 230 disposed on the conduit 210 at a location distal from the expandable metal sleeve.

The swellable rubber sleeve 230 can include one or more of the following: an ethylene-propylene-diene monomer rubber, a butadiene rubber, a styrene-butadiene rubber, a natural rubber, an acrylonitrile butadiene rubber, a styrene-butadiene-acrylonitrile resin, a butadiene-nitrile rubber, a polyisoprene rubber, an acrylate-butadiene rubber, a poly-chloroprene rubber, an acrylate-isoprene rubber, an ethylene-vinyl acetate rubber, a polypropylene oxide rubber, a polypropylene sulfide rubber, a fluoroelastomer, or a thermoplastic polyurethane rubber.

Figure 4:
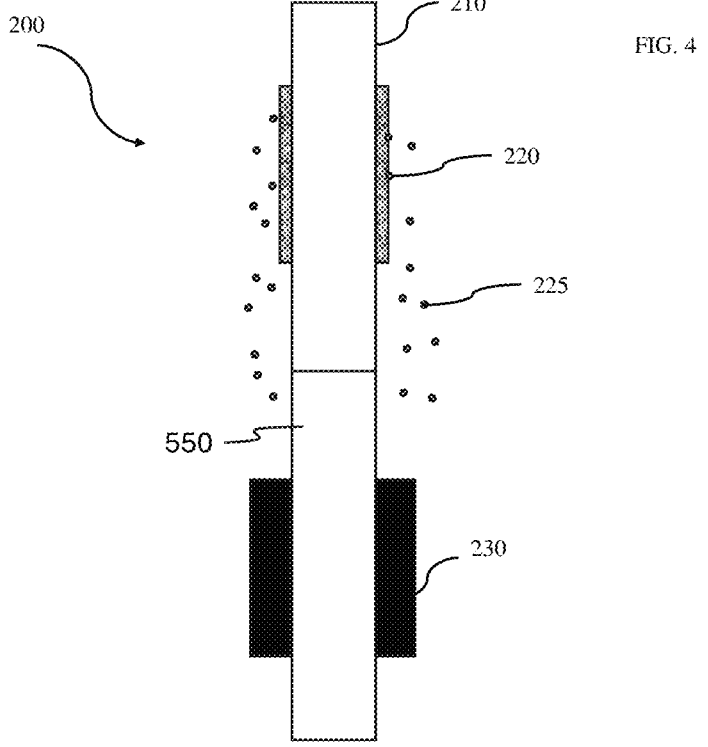
FIG. 4 illustrates an embodiment of the expandable metal sleeve.
Figure 5:
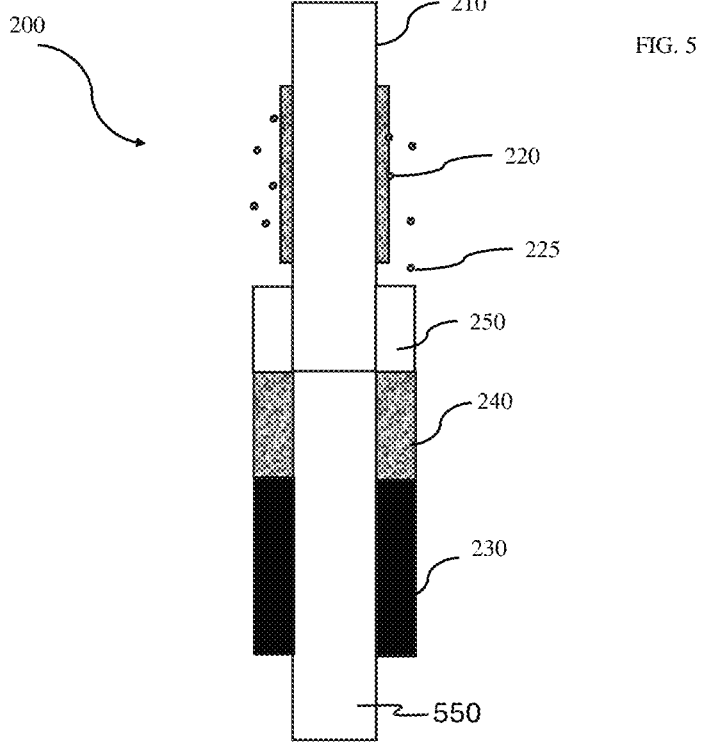
FIG. 5 illustrates an embodiment of the expandable metal sleeve.

As shown in FIGS. 4 and 5, as the expandable metal sleeve 220 encounters the fluid environment, the expandable metal particles 225 swell and detach. The fluid environment can include wellbore fluids, water, water vapor, brine, acid, and the like. Further saline can be injected into the well to initiate and accelerate the reaction of the expandable metal particles and water. As the detached expandable metal particles, detach and fall, the swellable rubber sleeve 230 provides a barrier stopping point. At this time, resin 250 is injected into the well to consolidate the expandable particles to form a pack 240. Heat can be used to partial melt the resin to further consolidate the pack. In an embodiment, pressure can be applied to further consolidate the pack. The pressure can be from about 5 megapascal to 50 megapascal. The temperatures can be from 50 degrees Celsius to 1000 degrees Celsius.

In an embodiment, the expandable metal particles can be used in to seal a portion of casing within the wellbore. In one embodiment, in one method of manufacturing the synergistic barrier, the expandable metal particles can be mixed with elastomeric particles. The expandable metal particles and elastomeric particles can be circulated into the wellbore in an annulus between the casing and a wall of the wellbore or another section of tubing. In an embodiment, the expandable metal particles and elastomeric particles are pumped into the wellbore at the desired location and can concentrate at a plug. The location of the plug can be adjusted. The plug is a temporary barrier used in a wellbore to seal off sections of the well.

In an embodiment, the plug of the casing includes a collection device that allows wellbore fluid to pass but collects the expandable metal particles and elastomeric particles. Collecting the expandable metal particles and elastomeric particles results in the concentration of the expandable metal particles and elastomeric particles at the plug of the casing. The collection device can include screens, membranes, filtration devices and like.

When the expandable metal particles and elastomeric particles are in place at the plug or other location in the wellbore, a water-based solution can be injected into the annulus to wash away an oil-based fluid. Upon removal of the oil-based fluid, the expandable metal particles begin to react with the water-based solution to expand into a seal at the desired location of the casing. The elastomeric particles help fill the gaps or channels between the expandable metal particles.

Embodiment 1: A synergistic barrier formation, including a conduit disposed in a wellbore, a wellbore barrier disposed on the conduit, the wellbore barrier including a matrix material with expandable metal particles dispersed homogeneously therein, and wherein the matrix material comprises a polymer, a bladder, or a combination thereof.

Embodiment 2: The synergistic barrier formation as in any prior embodiment, wherein the expandable metal particles comprise magnesium, aluminum, calcium, iron, silicon, zinc, tin, potassium, sodium, lithium, beryllium, barium, manganese, or a combination thereof.

Embodiment 3: The synergistic barrier formation as in any prior embodiment, wherein the expandable metal particles comprise an alloy.

Embodiment 4: The synergistic barrier formation of as in any prior embodiment, wherein the expandable metal particles are coated and wherein the coating comprises a polymer, a ceramic, a metal, or a combination thereof.

Embodiment 5: The synergistic barrier formation as in any prior embodiment, wherein the matrix material comprises the polymer, and wherein the polymer comprises an ethylene-propylene-diene monomer rubber, a butadiene rubber, a styrene-butadiene rubber, a natural rubber, an acrylonitrile butadiene rubber, a styrene-butadiene-acrylonitrile resin, a butadiene-nitrile rubber, a polyisoprene rubber, an acrylate-butadiene rubber, a polychloroprene rubber, an acrylate-isoprene rubber, an ethylene-vinyl acetate rubber, a polypropylene oxide rubber, a polypropylene sulfide rubber, a fluoroelastomer, a thermoplastic polyurethane rubber, or a combination thereof.

Embodiment 6: The synergistic barrier formation as in any prior embodiment, wherein matrix material comprises the bladder.

Embodiment 7: A method of forming a synergistic barrier formation, the method including forming a wellbore barrier on a conduit disposed in a wellbore, wherein the wellbore barrier comprises, a matrix material with expandable metal particles dispersed homogeneously therein; and wherein the matrix material comprises a polymer, a bladder, or a combination thereof; and exposing the wellbore barrier to water, acid, saline or heat.

Embodiment 8: The method as in any prior embodiment, wherein the expandable metal particles comprise magnesium, aluminum, calcium, iron, silicon, zinc, tin, potassium, sodium, lithium, beryllium, barium, manganese, or a combination thereof.

Embodiment 9: The method as in any prior embodiment, wherein exposing the wellbore barrier to water, acid, saline, or heat causes a reaction between the expandable metal particles and water resulting in a metal hydroxide, and wherein the metal hydroxide comprises a larger volume than the expandable metal particles before the reaction.

Embodiment 10: The method as in any prior embodiment, wherein the larger volume of the expandable metal particles causes the wellbore barrier to seal the wellbore.

Embodiment 11: A method of forming a pack, including forming an expandable metal sleeve on the conduit, wherein the expandable metal sleeve comprises expandable metal particles, forming a swellable rubber sleeve on the conduit at a location distal to the expandable metal sleeve, exposing the expandable metal particles to water, acid, saline or heat causing the expandable metal sleeve to corrode to form corroded metal particles, detaching the corroded metal particles from the expandable metal sleeve, and consolidating the corroded metal particles on the swellable rubber sleeve.

Embodiment 12: The method as in any prior embodiment, wherein the swellable rubber sleeve comprises an ethylene-propylene-diene monomer rubber, a butadiene rubber, a styrene-butadiene rubber, a natural rubber, an acrylonitrile butadiene rubber, a styrene-butadiene-acrylonitrile resin, a butadiene-nitrile rubber, a polyisoprene rubber, an acrylate-butadiene rubber, a polychloroprene rubber, an acrylate-isoprene rubber, an ethylene-vinyl acetate rubber, a polypropylene oxide rubber, a polypropylene sulfide rubber, a fluoroelastomer, a thermoplastic polyurethane rubber, or a combination thereof.

Embodiment 13: The method as in any prior embodiment, wherein the consolidating of the corroded metal particle occurs by applying heat and pressure.

Embodiment 14: The method as in any prior embodiment, further comprising injecting saline into the casing to accelerate the corrosion process.

Embodiment 15: The method as in any prior embodiment, wherein the corrosion process is a reaction between the expandable metal particles and water resulting in a metal hydroxide, and wherein the metal hydroxide comprises a larger volume than the expandable metal particles before the reaction.

Embodiment 16: The method as in any prior embodiment, wherein the expandable metal particles comprise magnesium, aluminum, calcium, iron, silicon, zinc, tin, potassium, sodium, lithium, beryllium, barium, manganese, or a combination thereof.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" can include a range of ±8% of a given value.

The teachings of the present disclosure may be used in a variety of well operations. These operations may involve using one or more treatment agents to treat a formation, the fluids resident in a formation, a borehole, and/or equipment in the borehole, such as production tubing. The treatment agents may be in the form of a combination of at least one of the foregoing liquids, gases, solids, or semi-solids. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A method of forming a pack, comprising:
   forming an expandable metal sleeve on a conduit, wherein the expandable metal sleeve comprises expandable metal particles;
   forming a swellable rubber sleeve on the conduit at a location distal to the expandable metal sleeve;
   exposing the expandable metal particles to water, acid, saline or heat causing the expandable metal particles to corrode to form corroded metal particles;
   detaching the corroded metal particles from the expandable metal sleeve; and injecting a resin to consolidate the corroded metal par-
ticles on the swellable rubber sleeve.

2. The method of claim 1, wherein the swellable rubber
sleeve comprises an ethylene-propylene-diene monomer
rubber, a butadiene rubber, a styrene-butadiene rubber, a
natural rubber, an acrylonitrile butadiene rubber, a styrene-
butadiene-acrylonitrile resin, a butadiene-nitrile rubber, a
polyisoprene rubber, an acrylate-butadiene rubber, a poly-
chloroprene rubber, an acrylate-isoprene rubber, an ethyl-
ene-vinyl acetate rubber, a polypropylene oxide rubber, a
polypropylene sulfide rubber, a fluoroelastomer, a thermo-
plastic polyurethane rubber, or a combination thereof.

3. The method of claim 1, wherein the consolidating of the
corroded metal particles occurs by applying heat and pres-
sure.

4. The method of claim 1, further comprising injecting
saline into a casing in which the pack is located to accelerate
a corrosion process of the expandable metal particles.

5. The method of claim 4, wherein the corrosion process
is a reaction between the expandable metal particles and
water resulting in a metal hydroxide, and wherein the metal
hydroxide comprises a larger volume than the expandable
metal particles before the reaction.

6. The method of claim 5, wherein the expandable metal
particles comprise magnesium, aluminum, calcium, iron,
silicon, zinc, tin, potassium, sodium, lithium, beryllium,
barium, manganese, or a combination thereof.

\* \* \* \* \*